United States Patent
Yu et al.

(10) Patent No.: US 9,611,003 B1
(45) Date of Patent: Apr. 4, 2017

(54) ELECTRIC BICYCLE FRAME

(71) Applicant: Fairly Bike Manufacturing Co., Ltd, New Taipei (TW)

(72) Inventors: Yu-Chi Yu, New Taipei (TW); Shu-Siou Ye, New Taipei (TW)

(73) Assignee: FAIRLY BIKE MANUFACTURING CO., LTD., New Taipei (TW)

( * ) Notice: Subject to any disclaimer, the term of this patent is extended or adjusted under 35 U.S.C. 154(b) by 0 days.

(21) Appl. No.: 14/936,838

(22) Filed: Nov. 10, 2015

(30) Foreign Application Priority Data

Oct. 1, 2015 (TW) .................................. 104215767

(51) Int. Cl.
   - *B62M 6/90* (2010.01)
   - *B62M 6/40* (2010.01)
   - *B62K 19/30* (2006.01)

(52) U.S. Cl.
   CPC .............. *B62M 6/90* (2013.01); *B62K 19/30* (2013.01); *B62M 6/40* (2013.01)

(58) Field of Classification Search
   CPC ............ B62M 6/90; B62M 6/40; B62K 19/30
   See application file for complete search history.

(56) References Cited

U.S. PATENT DOCUMENTS

| | | | | |
|---|---|---|---|---|
| 5,390,754 A * | 2/1995 | Masuyama | ............... | B60K 1/04 105/51 |
| 5,557,961 A * | 9/1996 | Ni | ........................ | B21D 22/025 29/421.1 |
| 6,564,893 B2 * | 5/2003 | Lipman | ............... | H01M 2/1083 180/68.5 |
| 7,393,125 B1 * | 7/2008 | Lai | ........................... | B62M 6/90 280/281.1 |
| 8,979,110 B2 * | 3/2015 | Talavasek | ................ | B62M 6/90 280/279 |
| 9,387,906 B2 * | 7/2016 | Rasmussen | ......... | H01M 10/486 |
| 2010/0175939 A1 * | 7/2010 | Cheng | ..................... | B60R 16/04 180/68.5 |
| 2010/0237585 A1 * | 9/2010 | Binggeli | .................. | B62M 6/90 280/288.4 |
| 2011/0042156 A1 * | 2/2011 | Vincenz | ................. | B62H 5/001 180/206.5 |
| 2015/0210351 A1 * | 7/2015 | Tagaya | ..................... | B62M 6/90 280/288.4 |
| 2015/0217833 A1 * | 8/2015 | Silva | ........................ | B62M 6/55 180/206.4 |
| 2016/0096493 A1 * | 4/2016 | Suzuki | ..................... | B62M 6/45 320/162 |

* cited by examiner

*Primary Examiner* — Kevin Hurley
*Assistant Examiner* — Marlon A Arce
(74) *Attorney, Agent, or Firm* — McClure, Qualey & Rodack, LLP

(57) ABSTRACT

An electric bicycle frame includes a seat tube, a down tube, a top tube, a battery box, and a battery body. The seat tube includes an upper portion and a lower portion. The down tube includes a first end and a second end. The second end is connected to the lower portion. The top tube includes a third end, an expanding tube, and a fourth end. The fourth end is connected to the upper portion. The expanding tube is between the third end and fourth end. The expanding tube includes a tube diameter varying portion and a top opening. The tube diameter varying portion includes continuously varying cross-sections. The battery box is assembled inside the top opening of the expanding tube. The battery body is received in the battery box.

16 Claims, 7 Drawing Sheets

ELECTRIC BICYCLE FRAME

CROSS-REFERENCES TO RELATED APPLICATIONS

This non-provisional application claims priority under 35 U.S.C. §119(a) on Patent Application No. 104215767 filed in Taiwan, R.O.C. on 2015/10/01, the entire contents of which are hereby incorporated by reference.

BACKGROUND

Technical Field

The instant disclosure relates to a bicycle frame and, more particularly, to an electric bicycle frame.

Related Art

The main structure of a bicycle includes a frame, a driving system, a front wheel, and a rear wheel. Power supply of the driving system of a conventional bicycle purely depends on man. In other words, a rider has to tread pedals to drive the rear wheel to rotate via gear wheels and a chain in order to have the bicycle moved. The frame can be analogous to the skeleton of a human body. Varied components are affixed to the frame to complete a bicycle. In the realm of conventional bicycles, the design of frames emphasizes mechanical strengths and properties.

A kind of electric bicycles is commercially available, which allows a rider who rides the electric bicycle to save more labor. The electric bicycles can not only be driven by treading pedals but also be selectively driven by motors. For example, a rider may easily get tired and even exhausts physical strength such that he cannot keep riding anymore when climbing by the conventional bicycle. If a rider climbs by riding an electric bicycle, it is helpful that the motor outputs auxiliary power for driving the bicycle to assist the rider in climbing. As a result, electric bicycle riders not only save time and labor but also have fun in terms of riding a bike.

The electric bicycle, as the name implies, is required electric power to drive the motor. The main issue regarding the design of the electric bicycle is the power source. The electric bicycles at present adopt batteries as the power source. The battery is installed on the frame. The common design is to increase the tube diameter of the down tube or the seat tube of the frame of the electric bicycle so that the battery can be installed in the down tube or the seat tube. The down tube or the seat tube utilized for receiving the battery is usually made in a manner of aluminum extrusion. An aluminum extrusion tube has continuously identical cross-sections; therefore, the appearance of the tube is dull and is hard to satisfy the aesthetic criteria. The configuration of the battery installing in the down tube or the seat tube is unfavorable to the rider since he has to put the battery in or take the battery out of the down tube or the seat tube. Thus, the installation and detachment of the battery is inconvenient. In addition, the design of the battery has another issue regarding waterproof performance since the electric bicycle is for outdoor use.

SUMMARY

To address the above issue, the instant disclosure provides an electric bicycle frame, which satisfies the aesthetic criteria in terms of the appearance, facilitates the installation and detachment of a battery, and improves waterproof performance.

According to an embodiment of the instant disclosure, an electric bicycle frame comprises a seat tube, a down tube, a top tube, a battery box, and a battery body. The seat tube comprises an upper portion and a lower portion. The down tube comprises a first end and a second end. The second end is connected to the lower portion of the seat tube. The top tube comprises a third end, an expanding tube, and a fourth end. The fourth end is connected to the upper portion of the seat tube. The expanding tube is between the third end and the fourth end. The expanding tube at least comprises a tube diameter varying portion and a top opening. The tube diameter varying portion comprises continuously varying cross-sections. The battery box is assembled inside the top opening of the expanding tube. The battery box comprises a surrounding lateral wall and a first connector. The first connector is disposed on the surrounding lateral wall. The battery body is detachably received in the battery box. The battery body comprises a second connector. The second connector correspondingly mates with the first connector to form an electrical connection therebetween.

Wherein, the first connector comprises a waterproof component. The battery body comprises a pressing surface. The second connector is disposed on the pressing surface. The pressing surface is correspondingly against the waterproof component. Moreover, the battery box further comprises a first guiding structure. The first guiding structure is disposed on the surrounding lateral wall of the battery box and is away from the first connector. The battery body further comprises a second guiding structure. The first guiding structure correspondingly mates the second guiding structure.

Concisely, the instant disclosure provides embodiments of the electric bicycle frame. At least a part of the top tube of the electric bicycle has continuously varying cross-sections. Comparing with a tube having continuously identical cross-sections, the appearance of the top tube of the electric bicycle frame of the embodiments of the instant disclosure satisfies the aesthetic criteria better. Moreover, the top tube has the battery box disposed therein, and the battery box is utilized for receiving the battery body. The top tube is closer to the rider than the seat tube and the down tube do. And there are guiding structures which are disposed between the battery body and the battery box, and are capable of mating with each other; therefore, the installation and detachment of the battery body can be more convenient. In addition, there are waterproof structures which are disposed between the first connector and the second connector, and are capable of mating with each other and providing better waterproof performance.

The features of the instant disclosure will no doubt become understandable to those of ordinary skill in the art after reading the following detailed description of the preferred embodiment that is illustrated in the various figures and drawings.

DETAILED DESCRIPTION

Figure 1:
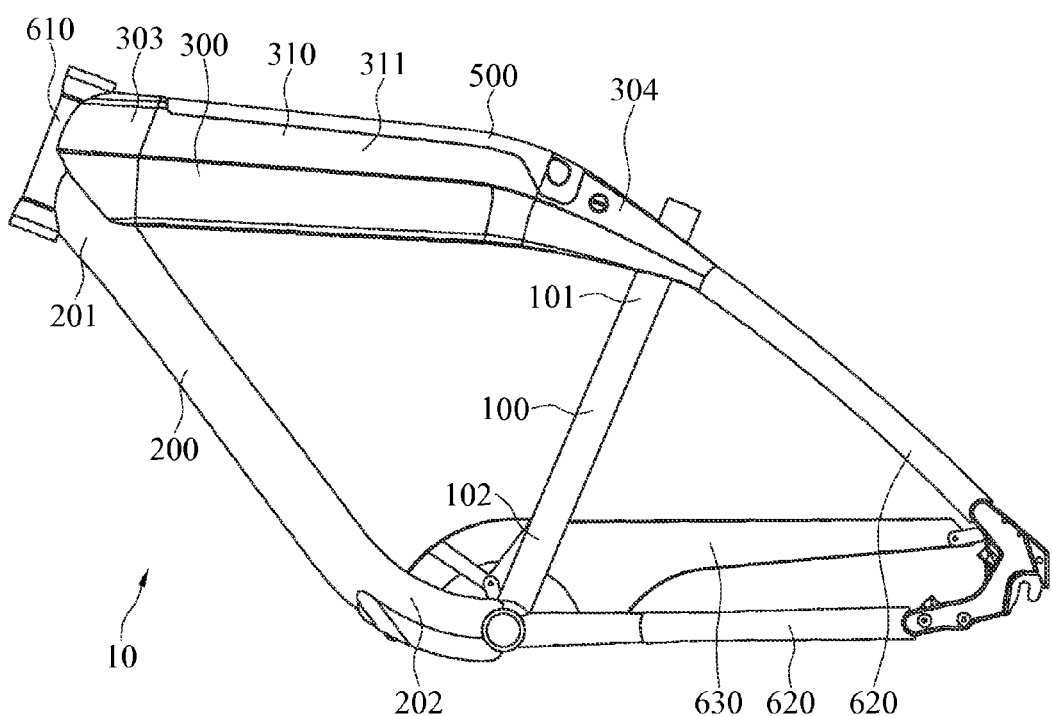
FIG. 1 illustrates a perspective view of an electric bicycle frame according to an embodiment of the instant disclosure.
Figure 2:
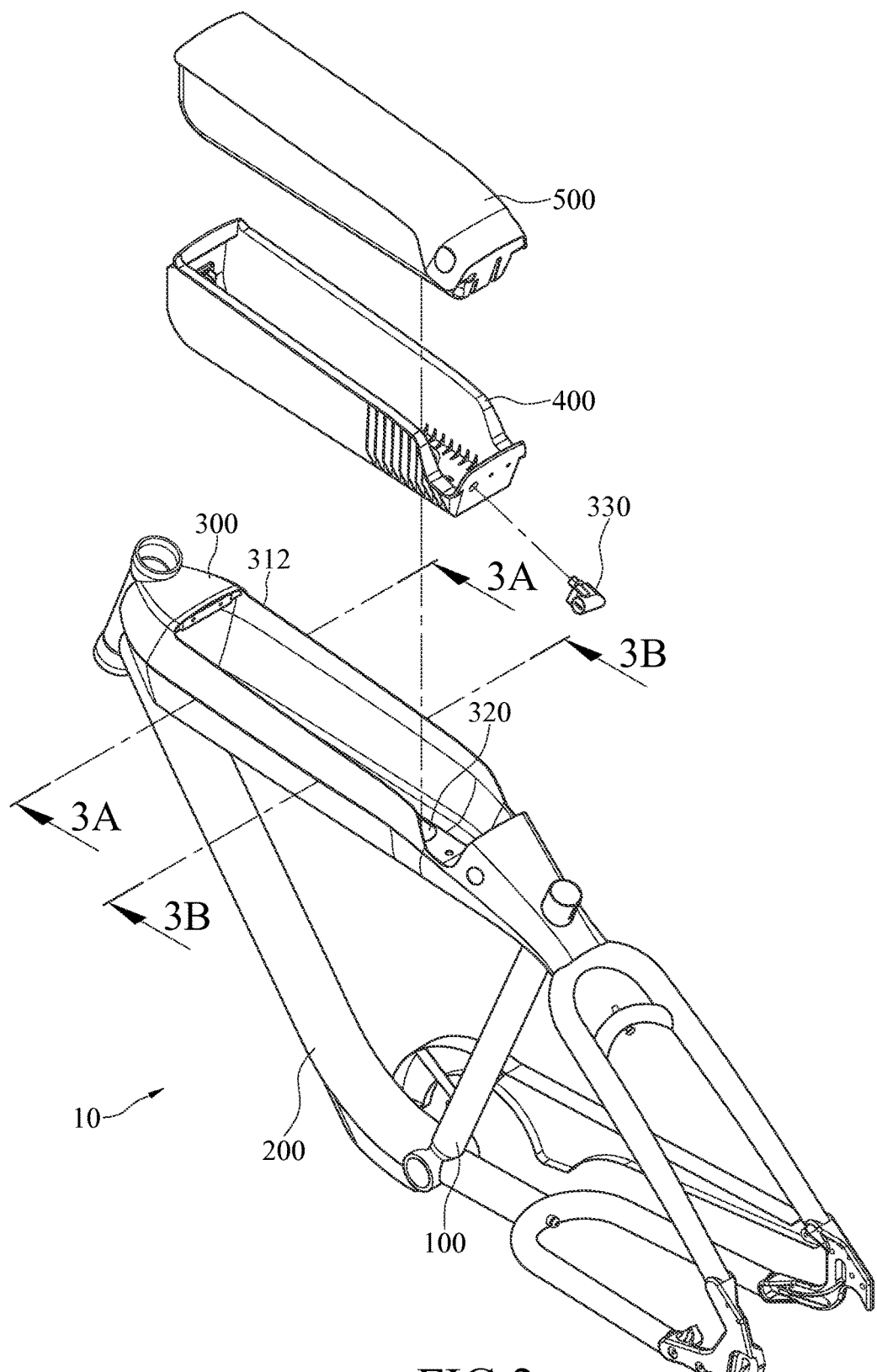
FIG. 2 illustrates an exploded view of the electric bicycle frame of FIG. 1.

Referring to FIG. 1 and FIG. 2, FIG. 1 illustrates a perspective view of an electric bicycle frame 10 according to an embodiment of the instant disclosure, and FIG. 2 illustrates an exploded view of the electric bicycle frame 10 of FIG. 1. In the embodiment, the electric bicycle frame 10 comprises a seat tube 100, a down tube 200, a top tube 300, a battery box 400, a battery body 500, a head tube 610, a rear stay 620, and a protective cover 630. The seat tube 100 comprises an upper portion 101 and a lower portion 102. A saddle can be inserted in the seat tube 100 through an opening on the top the seat tube 100. The down tube 200 comprises a first end 201 and a second end 202. Wherein, the second end 202 is connected to the lower portion 102 of the seat tube 100. The top tube 300 comprises a third end 303, an expanding tube 310, and a fourth end 304. Wherein, the fourth end 304 is connected to the upper portion 101 of the seat tube 100. The expanding tube 310 is between the third end 303 and the fourth end 304. The first end 201 of the down tube 200 and the third end 303 of the top tube 300 are interconnected to each other. A bicycle handlebar can be inserted in the head tube 610 through an opening on the top of the head tube 610. The lower side of the head tube 610 can be further connected to a bicycle front fork. The seat tube 100, the top tube 300, and the down tube 200 form a triangular structure. The head tube 610 is fixed to the intersection of the top tube 300 and the down tube 200. The rear stay 620 is located at a side of the seat tube 100 opposite to the top tube 300 and the down tube 200, and the rear stay 620 is respectively connected to the upper portion 101 and the lower portion 102 of the seat tube 100; therefore, the rear stay 620 and the seat tube 100 form another triangular structure. The protective cover 630 is located at a side of the seat tube 100, the down tube 200, and the rear stay 620. The protective cover 630 is connected to the lower portion 102 of the seat tube 100, the second end 202 of the down tube 200, and the rear stay 620. Wherein, the protective cover 630 is utilized for covering components of a bicycle driving system such as gear wheels and a chain.

The expanding tube 310 at least comprises a tube diameter varying portion 311 and a top opening 312. The battery box 400 is assembled inside the top opening 312 of the expanding tube 310, meaning that the battery box 400 can be put in the expanding tube 310 through the top opening 312 and can be then fastened in the expanding tube 310. The battery body 500 is detachably received in the battery box 400. In other words, the battery body 500 can be installed in the battery box 400 and can be detached from the battery box 400 in order to be replaced or charged. The battery body 500 can be electrically connected to a motor of the bicycle driving system when the battery body 500 is properly installed in the battery box 400. The motor can be assembled between the protective cover 630 and the rear stay 620. The battery body 500 can output electric power to the motor in order to have the motor operated to drive gear wheels to rotate. The power of an electric bicycle adopting the electric bicycle frame 10 is selectively from man, i.e., a rider treads the pedals of the electric bicycle to drive gear wheels and wheels to rotate, or is selectively from electric power, i.e., the battery body 500 supplies electric power to the motor to drive gear wheels and wheels to rotate.

Figure 3A:
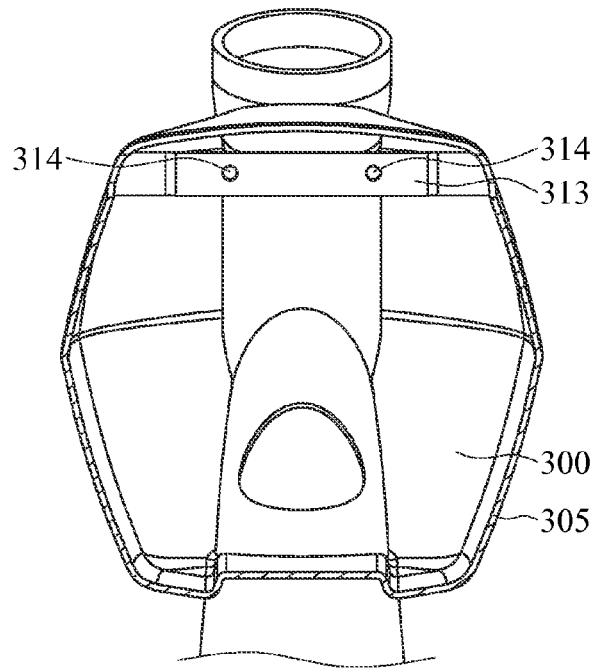
FIG. 3A illustrates a first cross-sectional view of the top tube of FIG. 2.
Figure 3B:
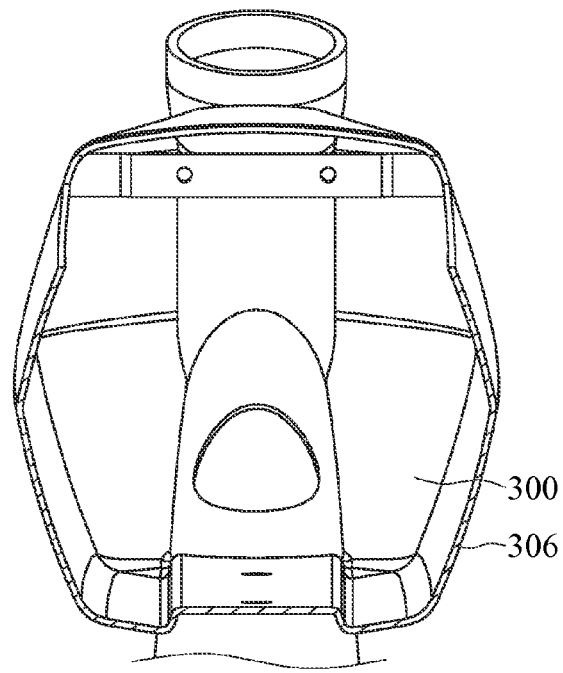
FIG. 3B illustrates a second cross-sectional view of the top tube of FIG. 2.

Referring to FIG. 1, FIG. 2, FIG. 3A, and FIG. 3B, FIG. 3A illustrates a cross-section 305 taken along the line 3A-3A of FIG. 2, and FIG. 3B illustrates a cross-section 306 taken along the line 3B-3B of FIG. 2. The tube diameter varying portion 311 of the expanding tube 310 of the top tube 300 comprises continuously varying cross-sections. In the embodiment, the tube diameter varying portion 311 of the expanding tube 310 extends from the third end 303 to the fourth end 304. In other words, the whole expanding tube 310 of the embodiment pertains to the tube diameter varying portion 311. The definition of the continuously varying cross-sections is as follows: radial cross-sections of the tube diameter varying portion 311 along and relative to a longitudinal axis of the top tube 300 extending from the third end 303 to the fourth end 304 is continuously varying; therefore, cross-sections of the tube diameter varying portion 311 taken at any place relative to the longitudinal axis are all different from one another.

As shown in FIG. 3A and FIG. 3B, the cross-section 305 of the tube diameter varying portion 311 shown in FIG. 3A is closer to the third end 303 relative to the fourth end 304, and the cross-section 306 of the tube diameter varying portion 311 shown in FIG. 3B is closer to the fourth end 304 relative to the third end 303. The cross-section 305 and the cross-section 306 are different. The width and height of the cross-section 305 of the tube diameter varying portion 311 are both greater than those of the cross-section 306 of the tube diameter varying portion 311. Moreover, as shown in FIG. 1, the height of the expanding tube 310 gradually increases along a direction from the fourth end 304 toward the third end 303 in the embodiment. As shown in FIG. 2, FIG. 3A, and FIG. 3B, the width of the expanding tube 310 also gradually increases along a direction from the fourth end 304 toward the third end 303 in the embodiment.

In some embodiments, as shown in FIG. 1, FIG. 2, and FIG. 3A, the expanding tube 310 further comprises a fastening plate 313. The fastening plate 313 is fixed in the expanding tube 310 and is close to the third end 303. In addition, the fastening plate 313 comprises threaded holes 314. Screws can pass through corresponding holes on the battery box 400 and be fastened in the threaded holes 314 of the fastening plate 313 when the battery box 400 is put in the expanding tube 310; as a result, the battery box 400 can be fixed in the expanding tube 310.

In the embodiment, the top tube 300 is made by hydroforming process, and the material of the top tube 300 is aluminum. In other words, the top tube 300 is a hydroforming aluminum tube. Moreover, the top tube 300 can form continuously varying cross-sections base on the technique of the hydroforming process; therefore, the top tube 300 can be highly variable with respect to its appearance, and can satisfy strict aesthetic criteria. In other embodiments, the expanding tube 310 can be made by expanding process or be made by other analogously processes capable of forming continuously varying cross-sections of a tube.

Figure 4:
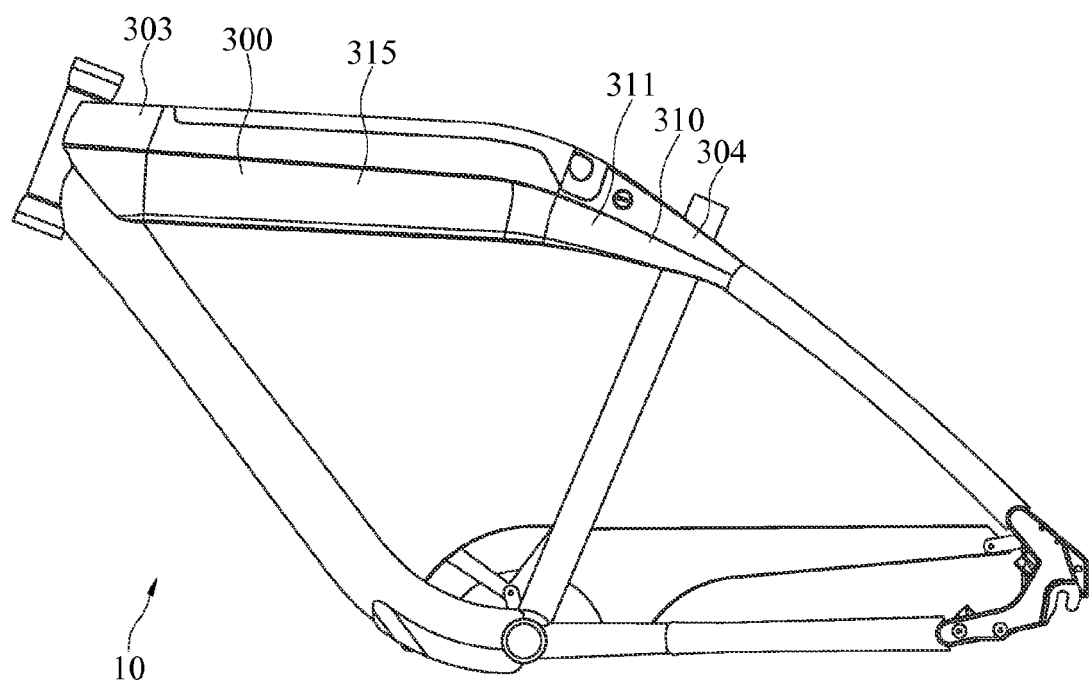
FIG. 4 illustrates a side view of an electric bicycle frame according to another embodiment of the instant disclosure.

Referring FIG. 4, FIG. 4 illustrates a side view of an electric bicycle frame 10 according to another embodiment of the instant disclosure. In addition to the tube diameter varying portion 311, the expanding tube 310 further comprises a straight portion 315 in the embodiment. The tube diameter varying portion 311 is between the fourth end 304 and the straight portion 315. The straight portion 315 is between the tube diameter varying portion 311 and the third end 303. The tube diameter varying portion 311 gradually expands along a direction from the fourth end 304 toward the straight portion 315. The straight portion 315 instead has continuously identical cross-sections. The height and width of the straight portion 315 are continuously identical along the longitudinal axis of the top tube 300 from the third end 303 to the fourth end 304. In other words, radial cross-sections, i.e., the cross-sections, of the straight portion 315 relative to the longitudinal axis are continuously identical. But the cross-sections of the straight portion 315 can be different from those of the tube diameter varying portion 311. In the embodiment, the top tube 300 is an aluminum extrusion tube. In some embodiments, the tube diameter varying portion 311 can be processed via a tube-reducing process such that the tube diameter of the tube diameter varying portion 311 can be gradually reduced along a direction from the straight portion 315 toward the fourth end 304. As a result, the straight portion 315 and the tube diameter varying portion 311 as a whole also form an expanding effect in appearance analogous to the expanding tube 310. In other words, the tube diameter of the tube diameter varying portion 311 gradually increases along a direction from a place being close to the fourth end 304 toward the straight portion 315. The manufacturing cost of the top tube 300 in the embodiment is relatively low but the top tube 300 can be still variable in appearance based on the aluminum extrusion process.

In another embodiment, there can be another tube diameter varying portion (not shown) added in front of the straight portion 315 by the tube-reducing process and connected to the third end 303. The tube diameter of the added tube diameter varying portion can gradually decreases along a direction from the straight portion 315 toward the third end 303. The top tube 300 with the added tube diameter varying portion between the third end 303 and the straight portion 315 can contribute a continuously varying shape and a low wind drag configuration.

Figure 5:
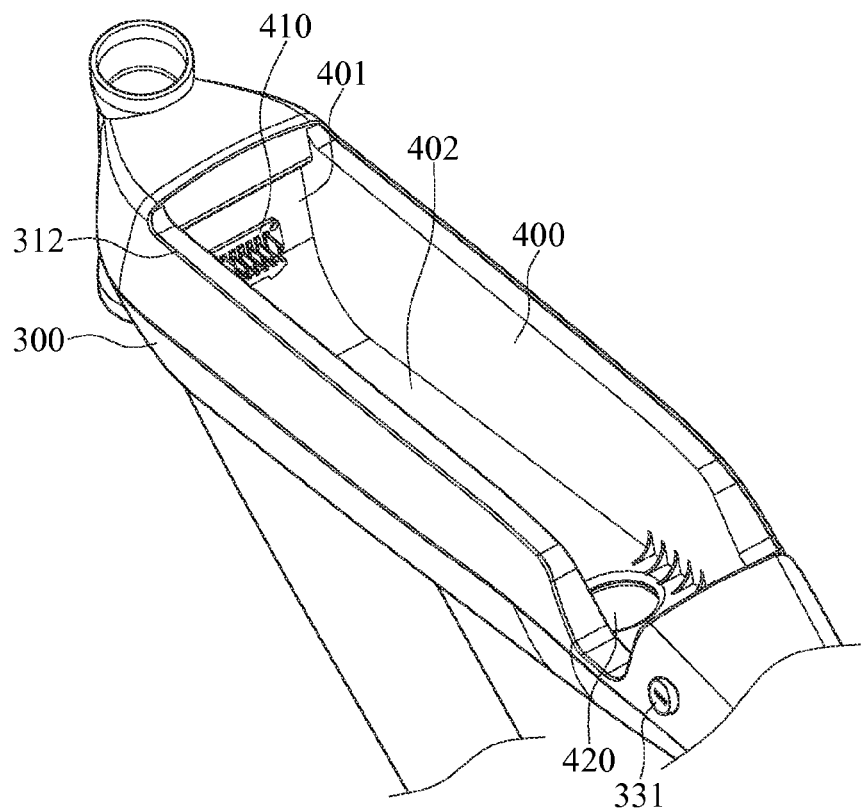
FIG. 5 illustrates a perspective view of the top tube and the battery box of FIG. 1.

Referring to FIG. 2 and FIG. 5, FIG. 5 illustrates a perspective view of the top tube 300 and the battery box 400 of FIG. 1. The battery box 400 comprises a surrounding lateral wall 401 and a first connector 410. Wherein, the first connector 410 is disposed on the surrounding lateral wall 401. As shown in FIG. 2, the top tube 300 further comprises an outer draining hole 320 and a locking portion 330. Wherein, the outer draining hole 320 is disposed on a bottom surface of the top tube 300 opposite to the top opening 312. The locking portion 330 is disposed in the top tube 300 and is between the battery box 400 and the fourth end 304. The locking portion 330 comprises a keyhole 331. The keyhole 331 is exposed from an outer surface of the top tube 300. A corresponding key can be inserted into the keyhole 331 and then can be rotated to lock or unlock the locking portion 330.

In the embodiment, the battery box 400 further comprises a bottom surface 402 and an inner draining hole 420. The inner draining hole 420 is disposed on the bottom surface 402. The outer draining hole 320 and the inner draining hole 420 are in positional correspondence. If liquid, e.g., rain water, flows into the battery box 400, the liquid can then flow out via the inner draining hole 420 and the outer draining hole 320 to prevent from ponding in the top tube 300.

Figure 6:
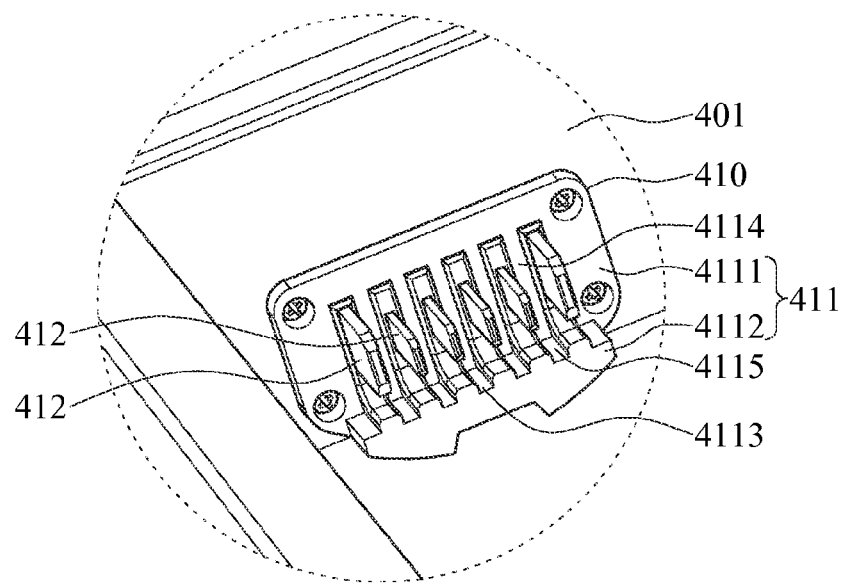
FIG. 6 illustrates an enlarged view of the first connector of FIG. 5.
Figure 7:
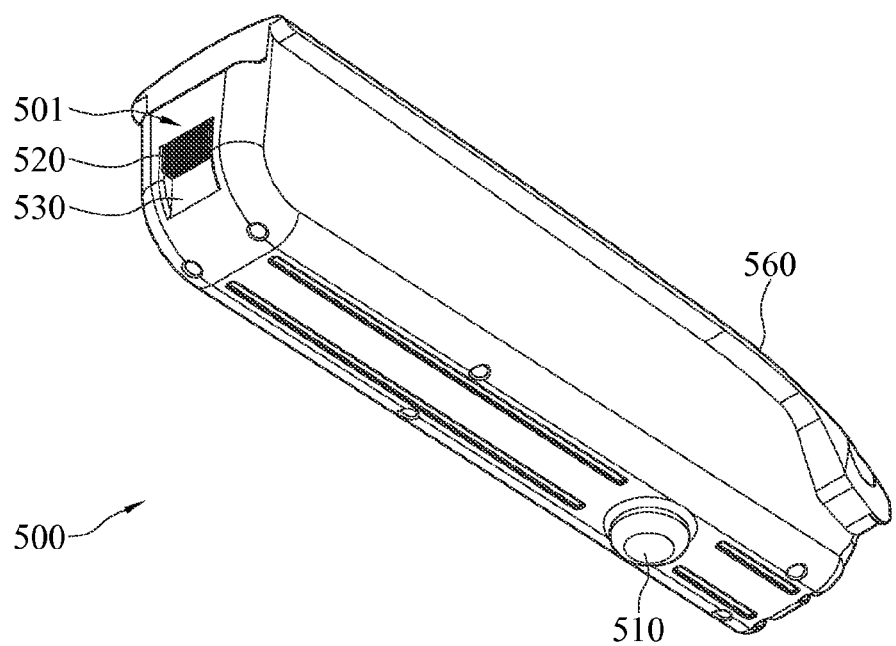
FIG. 7 illustrates a perspective view of the battery body of FIG. 1.
Figure 8:
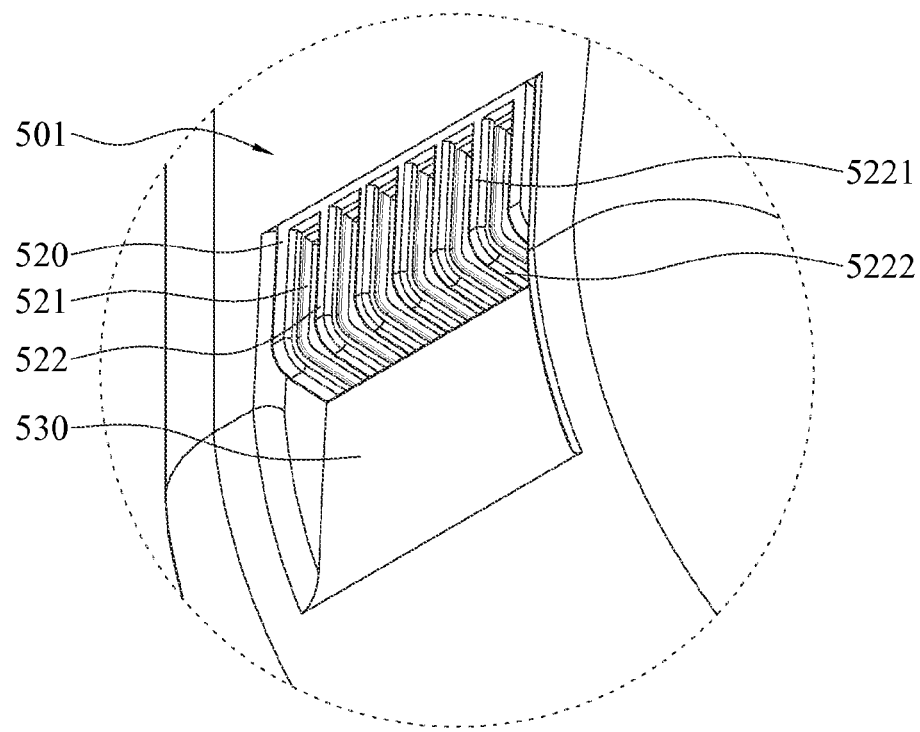
FIG. 8 illustrates an enlarged view of the second connector of FIG. 7.

Referring to FIG. 6, FIG. 7, and FIG. 8, FIG. 6 illustrates an enlarged view of the first connector 410 of FIG. 5, FIG. 7 illustrates a perspective view of the battery body 500 of FIG. 1, and FIG. 8 illustrates an enlarged view of the second connector 520 of FIG. 7. Wherein, the first connector 410 is capable of being electrically connected to the battery body 500. As shown in FIG. 7, the battery body 500 comprises a second connector 520. The second connector 520 is capable of correspondingly mating with the first connector 410 to form an electrical connection therebetween. Wherein, the first connector 410 can be connected to the motor via electric wires; therefore, the motor can be electrically connected to the battery body 500 via the first connector 410 so as to receive electric power of the battery body 500 when the battery body 500 is properly installed in the battery box 400. Alternatively, the first connector 410 can be connected to outside power supply (e.g., electric utility network). The battery body 500 can be charged via electric wires connected to the power supply, and users need not take the battery body 500 out of the battery box 400 under the circumstance.

In some embodiments, as shown in FIG. 7, the battery body 500 further comprises a positioning component 510. The positioning component 510 can be correspondingly inserted in the inner draining hole 420 and the outer draining hole 320. The positioning component 510 can cooperate with the inner draining hole 420 and the outer draining hole 320 for positioning when users install the battery body 500 in the battery box 400. Moreover, the positioning component 510 does not tightly fit the inner draining hole 420 and the outer draining hole 320. There is a gap between the positioning component 510, the inner draining hole 420 and the outer draining hole 320 so that liquid inside the top tube 300 can flow out via the gap.

In the embodiment, as shown in FIG. 6, the first connector 410 comprises a waterproof component 411. As shown in FIG. 7, the battery body 500 further comprises a pressing surface 501. The second connector 520 is disposed on the pressing surface 501. The pressing surface 501 is correspondingly against the waterproof component 411 to achieve waterproof effect when the battery body 500 is properly installed in the battery box 400. As a result, liquid cannot flow in to avoid short circuit when the first connector 410 correspondingly mates the second connector 520. The waterproof component 411 can be elastic material such as silica gel or rubber. When the pressing surface 501 is correspondingly against the waterproof component 411, the waterproof component 411 is pressed by the pressing surface 501 to have elastic deformation such that the waterproof component 411 tightly fits the pressing surface 501 to achieve better waterproof performance.

In some embodiments, as shown in FIG. 6, the waterproof component 411 comprises a pressing plate 4111 and a guiding block 4112. The guiding block 4112 protrudes from the pressing plate 4111. As shown in FIG. 7, a guiding slot 530 is recessed from the pressing surface 501. The second connector 520 is in the guiding slot 530. During the process of the battery body 500 being installed in the battery box 400, the guiding slot 530 is capable of guiding the guiding block 4112 to slide so as to have the pressing surface 501 be correspondingly against the pressing plate 4111 and have the second connector 520 correspondingly mate with the first connector 410.

In some embodiments, as shown in FIG. 6, the first connector 410 further comprises a plurality of pins 412. The pins 412 respectively protrude from the pressing plate 4111, and the pins 412 are located at a side of the guiding block 4112. As shown in FIG. 8, the second connector 520 comprises a plurality of slots 521. The slots 521 are respectively recessed from the guiding slot 530. And the pins 412 are capable of being correspondingly inserted into the slots 521. During the process of the battery body 500 being installed in the battery box 400, the guiding slot 530 is capable of guiding the guiding block 4112 to slide so as to have the pins 412 moved along the guiding slot 530 from a portion in the guiding slot 530 without the slots 521 to another portion in the guiding slot 530 with the slots 521. Then the pressing surface 501 and the pressing plate 4111 are forced to close to each other when the pins 412 are moved in the slots 521. In the mean time, the pins 412 are inserted in the slots 521. The pins 412 are completely inserted in the slots 521 when the pressing surface 501 is correspondingly against the pressing plate 4111.

In some embodiments, as shown in FIG. 6, the waterproof component 411 further comprises a plurality of L-shaped troughs 4113. Each of the L-shaped troughs 4113 is disposed between each of the two adjacent pins 412. As shown in FIG. 8, the second connector 520 further comprises a plurality of separating plates 522. Each of the separating plates 522 is disposed between each of the two adjacent slots 521. In particular, as shown in FIG. 6, each of the L-shaped troughs 4113 comprises a first side trough 4114 and a second side trough 4115. Wherein, the first side troughs 4114 are disposed on the pressing plate 4111, and the second side troughs 4115 are disposed on the guiding block 4112. The first side trough 4114 is connected to the second side trough 4115 to form an L shape. Moreover, as shown in FIG. 8, each of the separating plates 522 comprises a first side edge 5221 and a second side edge 5222. The first side edge 5221 is connected to the second side edge 5222 to form an L shape. When the pressing surface 501 is correspondingly against the pressing plate 4111, and the pins 412 are completely inserted in the slots 521, each of the first side edges 5221 is correspondingly against each of the first side troughs 4114, and each of the second side edges 5222 is correspondingly against each of the second side troughs 4115. In other words, the separating plates 522 are respectively correspondingly embedded in the L-shaped troughs 4113 so as to achieve double waterproof effect.

Figure 9:
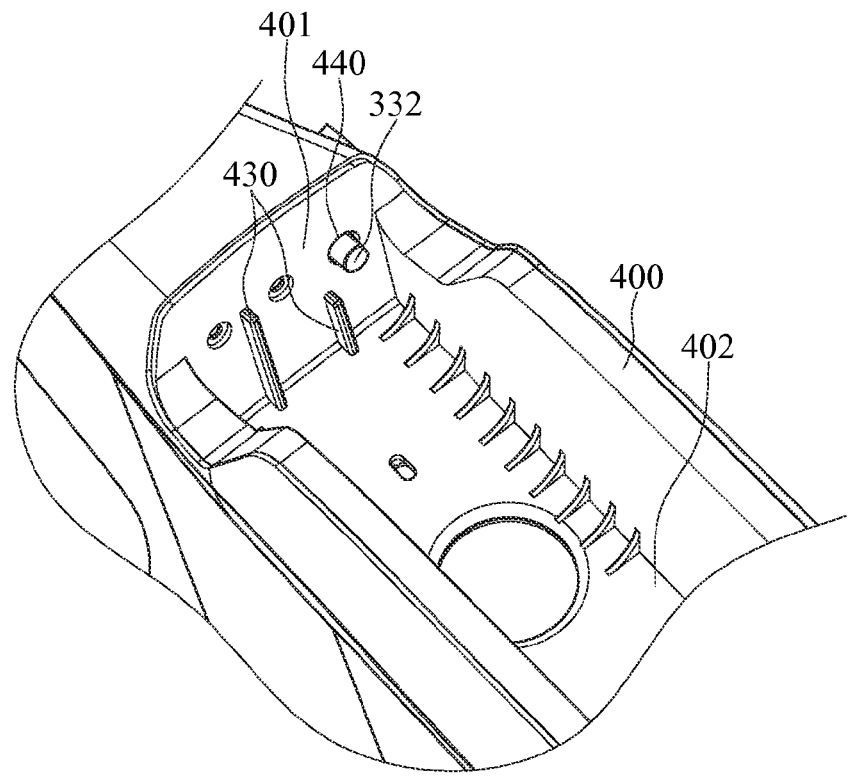
FIG. 9 illustrates a perspective view of the top tube and the battery box from another angle of FIG. 5.
Figure 10:
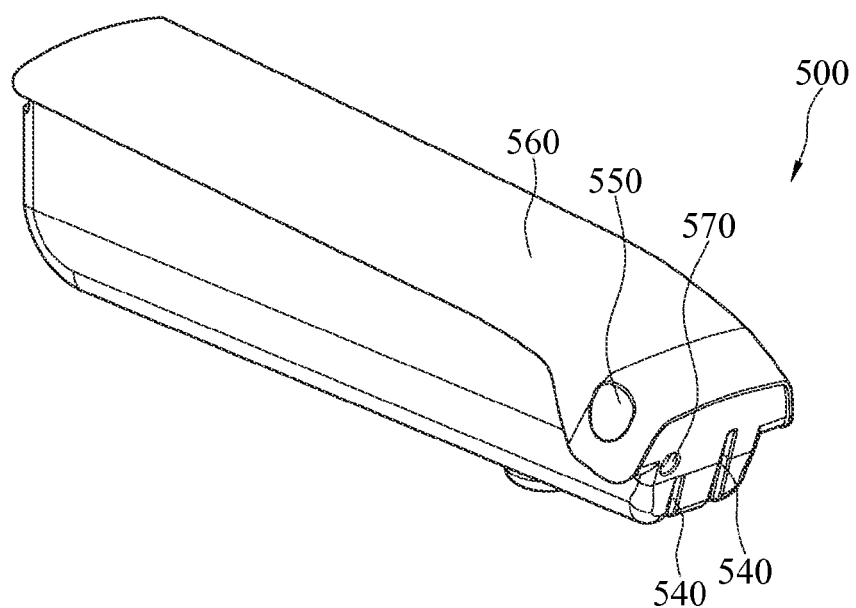
FIG. 10 illustrates a perspective view of the battery body from another angle of FIG. 7.

Referring to FIG. 9 and FIG. 10, FIG. 9 illustrates a perspective view of the top tube 300 and the battery box 400 from another angle of FIG. 5, and FIG. 10 illustrates a perspective view of the battery body 500 from another angle of FIG. 7. As shown in FIG. 9, the battery box 400 further comprises a first guiding structure 430. The first guiding structure 430 is disposed on the surrounding lateral wall 401 of the battery box 400 and is away from the first connector 410. In the embodiment, the first guiding structure 430 is located at an end of the battery box 400 opposite to the first connector 410. The first guiding structure 430 comprises, but is not limited to, two ribs protruded from the surrounding lateral wall 401, and one of the two ribs is longer than the other one. As shown in FIG. 10, the battery body 500 further comprises a second guiding structure 540, and the first guiding structure 430 is capable of correspondingly mating with the second guiding structure 540. In the embodiment, the second guiding structure 540 is located at an end of the battery body 500 opposite to the second connector 520. The second guiding structure 540 comprises, but is not limited to, two troughs recessed from the battery body 500, and one of the two troughs is longer than the other one. During the process of the battery body 500 being installed in the battery box 400, the ribs of the first guiding structure 430 mating with the troughs of the second guiding structure 540 can restrict the battery body 500 to slide along one direction so as to guiding the battery body 500 to be installed in the battery box 400.

In some embodiment, as shown in FIG. 10, the battery body 500 further comprises a grabbing portion 550. The grabbing portion 550 is located at an end of the battery body 500 opposite to the second connector 520. The grabbing portion 550 comprises two recesses. The two recesses are located at an end of the battery body 500 opposite to the second connector 520. And the two recesses are opposite to each other. A user can press the two recesses by his thumb and index finger or his thumb and middle finger to clamp and lift the battery body 500 when the user want to take the battery body 500 out of the battery box 400. In other embodiments, the grabbing portion 550 of the battery body 500 can instead comprise a handle. The handle is connected to an end of the battery body 500 opposite to the second connector 520. Users can grab the handle and lift the battery body 500.

In some embodiments, as shown in FIG. 1, FIG. 7, and FIG. 10, the battery body 500 further comprises a top cover 560. Wherein, the top cover 560 is integrated with the battery body 500, and the contour of the top cover 560 matches that of the top tube 300. After the battery body 500 is properly installed in the battery box 400, the top cover 560 of the battery body 500 correspondingly covers the top opening 312, and the top cover 560 and the top tube 300 form an appearance with integrity. In other embodiments, the battery body 500 does not have a top cover 560. The top tube 300 instead comprises a top cover (not shown) which can be detached or turned over. Under the circumstance, the top cover can correspondingly cover the top opening 312 when the battery body 500 is installed in the battery box 400. If a user wants to take out the battery body 500, he needs to remove or open the top cover in advance so as to take out the battery body 500.

In some embodiments, as shown in FIG. 2 and FIG. 9, the locking portion 330 further comprises a latch member 332. The battery box 400 further comprises a through hole 440. The latch member 332 is aligned with the through hole 440. As shown in FIG. 10, the battery body 500 further comprises an engaging hole 570. The engaging hole 570 is aligned with the through hole 440 when the battery body 500 is properly installed in the battery box 400. The latch member 332 selectively passes through the through hole 440 and is correspondingly inserted in the engaging hole 570 to be in a locking state; alternatively, the latch member 332 selectively retreats from the through hole 440 and the engaging hole 570 to be in an unlocking state. For example, a key can be inserted into the keyhole 331 and then can be rotated clockwise to have the latch member 332 passed through the through hole 440 and inserted in the engaging hole 570 so as to have the battery body 500 locked in the battery box 400. In the locking state, it is unallowable to take out the battery body 500. In contrast, the key can be inserted into the keyhole 331 and then can be rotated counterclockwise to have the latch member 332 retreated from the through hole 440 and the engaging hole 570 so as to have the battery body 500 to be in the unlocking state. In the unlocking state, it is allowable to take out the battery body 500.

While the instant disclosure has been described by way of example and in terms of the preferred embodiments, it is to be understood that the instant disclosure needs not be limited to the disclosed embodiments. For anyone skilled in the art, various modifications and improvements within the spirit of the instant disclosure are covered under the scope of the instant disclosure. The covered scope of the instant disclosure is based on the appended claims.

What is claimed is:

1. An electric bicycle frame, comprising:
   a seat tube comprising an upper portion and a lower portion;
   a down tube comprising a first end and a second end, the second end being connected to the lower portion of the seat tube;
   a top tube comprising a third end, an expanding tube, and a fourth end, the fourth end being connected to the upper portion of the seat tube, the expanding tube being between the third end and the fourth end, the expanding tube at least comprising a tube diameter varying portion and a top opening, the tube diameter varying portion comprising continuously varying cross-sections, both of a width and a height of the continuously varying cross-sections gradually increasing along a longitudinal axis of the top tube;
   a battery box assembled inside the top opening of the expanding tube, the battery box comprising a surrounding lateral wall and a first connector, the first connector being disposed on the surrounding lateral wall; and
   a battery body detachably received in the battery box, the battery body comprising a second connector, the second connector correspondingly mating with the first connector.

2. The electric bicycle frame of claim 1, wherein the top tube is a hydroforming aluminum tube.

3. The electric bicycle frame of claim 1, wherein the first connector comprises a waterproof component, the battery body comprises a pressing surface, the second connector is disposed on the pressing surface, and the pressing surface is correspondingly against the waterproof component.

4. The electric bicycle frame of claim 1, wherein the battery box further comprises a first guiding structure, the first guiding structure is disposed on the surrounding lateral wall of the battery box and is away from the first connector, the battery body further comprises a second guiding structure, and the first guiding structure correspondingly mates the second guiding structure.

5. The electric bicycle frame of claim 1, wherein the battery box further comprises a bottom surface and an inner draining hole, and the inner draining hole is disposed on the bottom surface.

6. The electric bicycle frame of claim 1, wherein the battery body further comprises a grabbing portion, the grabbing portion comprises two recesses, and the two recesses are located at an end of the battery body and are opposite to each other.

7. The electric bicycle frame of claim 1, wherein the battery body further comprises a grabbing portion, the grabbing portion comprises a handle, and the handle is connected to an end of the battery body.

8. The electric bicycle frame of claim 1, wherein the top tube further comprises a top cover, and the top cover correspondingly covers the top opening.

9. The electric bicycle frame of claim 1, wherein the top tube further comprises a locking portion, the locking portion comprises a latch member, the battery box further comprises a through hole, the battery body further comprises an engaging hole, the engaging hole is aligned with the through hole, and the latch member selectively passes through the through hole and is correspondingly inserted in the engaging hole, or selectively retreats from the through hole and the engaging hole.

10. An electric bicycle frame, comprising:
    a seat tube comprising an upper portion and a lower portion;
    a down tube comprising a first end and a second end, the second end being connected to the lower portion of the seat tube;
    a top tube comprising a third end, an expanding tube, and a fourth end, the fourth end being connected to the upper portion of the seat tube, the expanding tube being between the third end and the fourth end, the expanding tube at least comprising a tube diameter varying portion and a top opening, the tube diameter varying portion comprising continuously varying cross-sections, both of a width and a height of the continuously varying cross-sections gradually increasing along a longitudinal axis of the top tube;
    a battery box assembled inside the top opening of the expanding tube, the battery box comprising a surrounding lateral wall and a first connector, the first connector being disposed on the surrounding lateral wall; and
    a battery body detachably received in the battery box, the battery body comprising a second connector, the second connector correspondingly mating with the first connector,
    wherein the first connector comprises a waterproof component, the battery body comprises a pressing surface, the second connector is disposed on the pressing surface, and the pressing surface is correspondingly against the waterproof component,
    wherein the waterproof component comprises a pressing plate and a guiding block, the guiding block protrudes from the pressing plate, a guiding slot is recessed from the pressing surface, and the guiding slot is capable of guiding the guiding block to slide so as to have the pressing surface be correspondingly against the pressing plate and have the second connector correspondingly mate with the first connector.

11. The electric bicycle frame of claim 10, wherein the first connector further comprises a plurality of pins, the pins respectively protrude from the pressing plate and are located at a side of the guiding block, the second connector comprises a plurality of slots, the slots are respectively recessed from the guiding slot, and the pins are correspondingly inserted into the slots.

12. The electric bicycle frame of claim 11, wherein the waterproof component further comprises a plurality of L-shaped troughs, each of the L-shaped troughs is disposed between each of the two adjacent pins, the second connector further comprises a plurality of separating plates, each of the separating plates is disposed between each of the two adjacent slots, and the separating plates are respectively correspondingly embedded in the L-shaped troughs.

13. The electric bicycle frame of claim 10, wherein the battery box further comprises a first guiding structure, the first guiding structure is disposed on the surrounding lateral wall of the battery box and is away from the first connector, the battery body further comprises a second guiding structure, and the first guiding structure correspondingly mates the second guiding structure.

14. The electric bicycle frame of claim 10, wherein the top tube further comprises a top cover, and the top cover correspondingly covers the top opening.

15. The electric bicycle frame of claim 10, wherein the top tube further comprises a locking portion, the locking portion comprises a latch member, the battery box further comprises a through hole, the battery body further comprises an engaging hole, the engaging hole is aligned with the through hole, and the latch member selectively passes through the through hole and is correspondingly inserted in the engaging hole, or selectively retreats from the through hole and the engaging hole.

16. An electric bicycle frame, comprising:
- a seat tube comprising an upper portion and a lower portion;
- a down tube comprising a first end and a second end, the second end being connected to the lower portion of the seat tube;
- a top tube comprising a third end, an expanding tube, and a fourth end, the fourth end being connected to the upper portion of the seat tube, the expanding tube being between the third end and the fourth end, the expanding tube at least comprising a tube diameter varying portion and a top opening, the tube diameter varying portion comprising continuously varying cross-sections, both of a width and a height of the continuously varying cross-sections gradually increasing along a longitudinal axis of the top tube;
- a battery box assembled inside the top opening of the expanding tube, the battery box comprising a surrounding lateral wall and a first connector, the first connector being disposed on the surrounding lateral wall; and
- a battery body detachably received in the battery box, the battery body comprising a second connector, the second connector correspondingly mating with the first connector, wherein the battery box further comprises a bottom surface and an inner draining hole, and the inner draining hole is disposed on the bottom surface, wherein the battery body further comprises a positioning component, and the positioning component is correspondingly inserted in the inner draining hole.

* * * * *